Nov. 23, 1965  J. WILLY  3,219,502
METHOD OF APPLYING FOAM TO FABRIC
Filed March 4, 1963
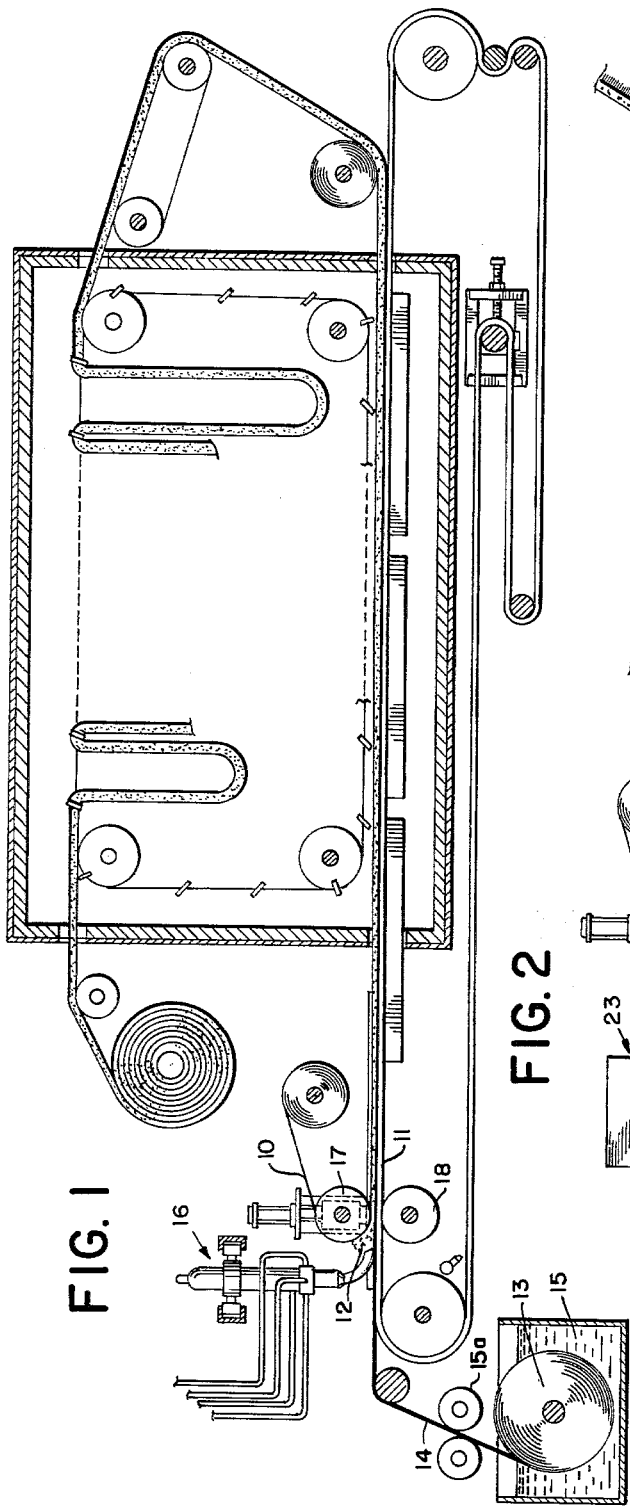
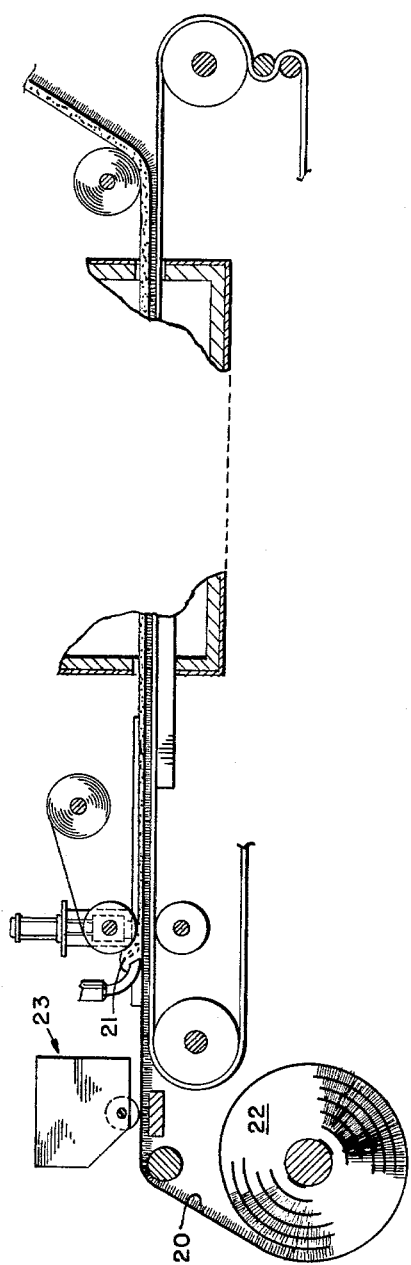
INVENTOR.
JOHN WILLY United States Patent Office 3,219,502
Patented Nov. 23, 1965

3,219,502
METHOD OF APPLYING FOAM TO FABRIC
John Willy, Attleboro, Mass., assignor to Specialty Converters, Inc., a corporation of Delaware
Filed Mar. 4, 1963, Ser. No. 262,545
11 Claims. (Cl. 156—79)

This invention relates to a method of applying foam to fabrics in which a chemical foaming mixture is expanded against a fabric for the purpose of adhering the foam to the fabric. More particularly, it relates to a method of this type in which the fabric to which the foam is to be adhered is wetted with a liquid, particularly an aqueous liquid like water, that is substantially immiscible to said chemical foaming mixture prior to expansion of the foaming mixture to render it repellent to the chemical foaming mixture, and in which the liquid is retained in the fabric during reaction of the foaming mixture to provide control over foam strike-through into the fabric.

The usefulness of fabrics and related articles having a foam sheet applied to the one face thereof is well-recognized. Of these composite foam-fabric products the most in demand are foam-fabric cloths and foam backed carpets in which a polyurethane foam is used. Heretofore, the most common method of applying foam to fabrics was first to form a thin sheet of foam and then apply the foam to the fabric by use of an adhesive to form a foam-fabric laminate. The use of adhesives has proven objectionable where the desired result is to form a composite foam-fabric product, such as a foam-fabric cloth, which must possess sufficient permeability to air so that it can be said to breathe. The presence of an adhesive unavoidably diminishes the permeability of the resultant product. Further, the adhesive in the resultant product tends to render the product less resilient, less flexible, more dense, and less absorbent than ordinary homogeneous foam, and the foam-fabric cloth itself loses its drape.

It has also been found that the method of applying the foam to a fabric by lamination is in itself a costly process, because it represents a separate process from the formation of the foam itself. In an effort to eliminate the adhesive from the composite product and to form the composite product in the same process as the foam product is made, one method proposed was to spread a liquid chemical foaming mixture on a layer of fabric or to cover the unreacted foaming mixture with the fabric and then allow the mixture to expand. It was theorized that the foam would expand into sheet form and the inherent tackiness of the uncured foam would cause the fabric to adhere to one face of the foam. Instead it was found that the foaming mixture expanded through the discontinuous structure of the usual fabric and thereby imbedded the fabric within the resultant foam sheet, rather than on the surface thereof. This phenomenon is commonly known as foam strike-through. It also sometimes happened that the fabric was absorptive of the foaming mixture and when the unexpanded mixture was absorbed within the fabric, it did not expand properly; rather, it bound the fibers of the fabric together to make a stiffer and unsatisfactory product.

It is a purpose of this invention to provide a method of applying fabric to foam during the formation of the foam itself and to control the degree of foam strike-through into the fabric. I have found that by wetting the fabric with a liquid that is substantially immiscible to the chemical foaming mixture being used, the wetted fabric repels adherence or attack by the liquid foaming mixture and thus precludes any foam strike-through into the fabric. Broadly stated, the method of the invention relates to applying foam to fabric by expanding a chemical foaming mixture against the fabric. In this method the fabric is first wetted with a liquid that is immiscible to the chemical foaming mixture to render at least a portion of the fabric repellent to the chemical foaming mixture. The chemical foaming mixture is then expanded in contact with the wetted portion of the fabric. The liquid is then retained within the fabric during reaction of the foaming mixture to control the degree of foam strike-through into the fabric. Finally, the liquid is substantially eliminated from the fabric before the resultant foam loses its tackiness so as to permit the fabric to contact the surface of the foam while it is still tacky, and thereby permit adherence of foam to the fabric. In its most simple form, an aqueous liquid such as water can be used in the method. Where the fabric to which the foam is to be adhered has a very discontinuous structure in which the interstices are so large that the liquid alone would not have sufficient viscosity to prevent strike-through, a thickener can be used in the liquid to increase its viscosity.

It is to be noted that of the liquids immiscible to the chemical foaming mixture, the most desirable from the standpoint of availability and cost as well as results is tap water. By simply saturating the fabric with plain water the above results were satisfactorily achieved. Although the use of water is a most simple expedient, it is not an obvious one. Indeed, an essential element of the catalyst mixture which reacts so readily with the chemical foaming mixture is water. Seemingly the water would further the reaction of the chemical foaming mixture and advance reaction and foam expansion between the interstices. Indeed, as will be seen, the water is immiscible to the mixture of the catalyst and prepolymer and precludes the degree of foam strike-through an amount depending upon the saturation of the fabrics with water.

According to the method of the invention it is possible not only to preclude all strike-through of foam into the fabric, but also to control the strike-through, i.e. to permit it to a limited amount where it might be advantageous. When it is desirable to preclude all foam strike-through, the liquid is retained within the wetted fabric until substantially all gaseous expansion of the foaming mixture has occurred. However, when some strike-through is to be permitted, the liquid is substantially eliminated from the fabric before complete gaseous expansion of the foaming mixture has occurred and before the resultant self-supporting foam structure loses its tackiness. An example of where foam strike-through will be permitted is in the application of foam as a backing to a carpet. In this application the foam can be applied to the carpet as it is just after weaving, i.e. where it consists of say a burlap backing through which the pile has been woven with loops of the pile being exposed on the backside of the carpet. The burlap backing with the loops exposed is wetted with a liquid that is substantially immiscible to the chemical foaming mixture being used and the mixture is allowed to expand against the backside of the carpet. Since it is desired to permit foam strike-through into the burlap backing and around the loops so as to stiffen the carpet somewhat, the liquid will be substantially eliminated from the carpet (e.g., by heating where a volatile liquid is used), before complete gaseous expansion of the foaming mixture has taken place and thereby allow some of the foam to strike-through the burlap backing.

The method of the invention can also be used in combination with a process for forming thin foam sheets wherein a chemical foaming mixture is expanded between carrier and cover sheets. Here the method for applying the thin foam sheet to a fabric by expanding the chemical foaming mixture against the fabric includes wetting a continuous length of fabric with an aqueous liquid to render at least one surface of the fabric repellent to the chemical foaming mixture. The wetted fabric is then passed between the carrier and cover sheets and the chemical foaming mixture is expanded in contact with the wetted portion. The aqueous liquid is retained within the fabric during reaction of the foaming mixture to control the degree of foam strike-through into the fabric. Finally, the aqueous solution is substantially eliminated from the fabric before the resultant foam loses its tackiness to permit adherence of the foam to the fabric. Of course the fabric used in this process can be either a discontinuous woven cotton fabric or a carpet as described above.

A preferred embodiment of the method of the invention is described hereinbelow with reference to the drawing wherein:

FIG. 1 is a side elevation partly in section of apparatus for casting thin cellular foam sheets and attaching a fabric thereto; and FIG. 2 is a fragmentary side elevation partly in section of the apparatus of FIG. 1 showing a carpet being fed through the apparatus for attachment to the foam sheet.

Referring now to FIG. 1 the apparatus for performing the method of the invention is shown. This apparatus consists basically of a cover sheet 10 and a carrier belt 11 which are movable together one over the other to define opposed forming surfaces which are releasable with respect to a chemical foaming mixture 12 which is deposited therebetween and allowed to expand. At the inlet end of the machine there is a supply roll 13 which contains a length of saturated cotton fabric 14 or other material which is to be adhered to a foam sheet. The supply roll 13 is submerged with a bath 15 of water. The fabric 14 is retained in the bath 15 for a sufficient length of time so that it becomes saturated with the water and then is stripped from roll 13 and fed into the apparatus. As the saturated fabric is passed to the apparatus, it is fed through a pair of wringer rolls 15a where excess water is squeezed from the fabric. By this means closer control can be maintained over the amount of water contained within the fabric. The chemical foaming mixture 12 is prepared in the usual way and is dispensed through a reciprocating mixing head assembly 16 and is deposited on one side of the cotton fabric as the cotton fabric is fed into the apparatus over the carrier belt 11. The carrier belt 11 and cover sheet 10 with the foaming mixture and the fabric therebetween are then passed through a pair of metering rolls 17 and 18 to determine the thickness of the resultant foam sheet 19. A polyurethane foaming mixture was used which consisted of a premixed resin comprising two-component polyether-based prepolymer systems, e.g., a prepolymer of toluene diisocyanate and an organic compound having two or more diisocyanate reactive groups with an excess of toluene diisocyanate. To 100 parts by weight of this premixed resin is added 0.5 part by weight of silicone oil, and this prepolymer mixture is placed in a reservoir. A catalyst mixture comprising 0.5 part by weight of N,N,N',N-tetramethylbutane diamine, 1.0 part triethylenediamine, and 2.3 parts by weight of distilled water. Here, the saturated cotton fabric 14 was spread on the carrier belt 11 and the foam mixture 12 was spread on the cotton fabric covered by the cover sheet 10. The cover sheet 10 and carrier belt 11 with the saturated cotton fabric and the chemical foaming mixture therebetween were then inserted between the metering rolls and the foaming mixture began to expand. By saturating the cotton fabric 14 it was found that the water was retained in the fabric throughout the gaseous expansion of the chemical foaming mixture, and the water, being immiscible to the foaming mixture, precluded any strike-through of foam into the fabric and retained the fabric on the surface of the thin foam sheet 19 that was formed. After all gaseous expansion has taken place but before the sheet is finally cured, the foam sheet is substantially self-supporting and very tacky. In order to advance the curing of the foam sheet, it is usually passed through several heating zones of increasingly higher temperatures. In this example, the heating caused the water to evaporate while the foam sheet was still tacky and thereby the fabric was firmly adhered to the surface of the foam sheet upon curing of the foam as it passed from the outlet end of the apparatus.

Referring now to FIG. 2 the apparatus is the same as that shown in FIG. 1 but here a length of carpet 20 is being fed into the apparatus. The carpet 20 shown is a tufted loop pile carpet consisting of wool pile woven on a burlap backing so that the pile loops are exposed at the back of the burlap backing. Formerly, a latex binding layer was applied to the back loops of the carpet to secure the loops in place and to stiffen the carpeting. Here, it was desired to apply the foaming mixture 21 to the back of the carpet immediately after weaving without applying any latex coating thereto. It was also desired to allow some strike-through of foam into the burlap and around the base of the tufted pile in order to stiffen the carpet somewhat. Also, owing to the rather loose knitting of the burlap as well as the irregularity of the carpet backing because of the presence of loops of pile fabric, it was thought that a more viscous aqueous liquid should be used. Accordingly, here as the carpet 20 is stripped from its supply roll 22 it is passed through a coating device 23 which applied a thickener (e.g. carboxy methylcellulose dissolved in a quantity of water to form a liquid) on the back of the carpet. The carpet was then passed through the apparatus in a similar manner as before with the foaming mixture 21 being deposited on the carpet backing to which the thickened water has been added. It was found that as the gaseous expansion took place, there was little or no strike-through of foam into the carpet backing. Since some small amount of strike-through was desired however, only enough thickened water was applied so that it repelled the expanding mixture for all but a short period before complete gaseous expansion took place. The heat applied to advance the gaseous expansion also caused enough of the thickened water to be dissipated to permit the foam to strike-through the burlap backing and form a matrix about the roots of the tufted pile so as to firmly bond the pile to the backing and stiffen the carpet. Of course, after complete gaseous expansion the surface of the foam sheet was tacky and the foam thereby became tightly bonded to the carpet.

Although an aqueous liquid is preferably used as the liquid, and water is perhaps the cheapest liquid which can be used, it is also contemplated that other liquids such as gasoline, oils and the like also might advantageously be used.

I claim:

1. A method of applying foam to fabric by expanding a chemical foaming mixture against a fabric comprising:
   (a) wetting the fabric with a liquid that is substantially immiscible to said chemical foaming mixture to render at least a portion of the fabric repellent to said chemical foaming mixture,
   (b) expanding the chemical foaming mixture in contact with said wetted portion to form a curable organic foam material,
   (c) retaining the liquid within the fabric during reaction of the foaming mixture to control the degree of foam strike-through into the fabric, and
   (d) substantially eliminating the liquid from the fabric before the resultant foam loses its tackiness to permit adherence of said curable foam to the fabric, and
   (e) curing the foam material.

2. A method of applying foam to fabric by expanding a chemical foaming mixture against a fabric comprising:
   (a) wetting the fabric with an aqueous liquid that is substantially immiscible to said chemical foaming mixture to render at least a portion of the fabric repellent to said chemical foaming mixture,
(b) expanding the chemical foaming mixture in contact with said wetted portion to form a curable organic foam material,
(c) retaining the liquid within the fabric during reaction of the foaming mixture to control the degree of foam strike-through into the fabric, and
(d) substantially eliminating the liquid from the fabric before the resultant foam loses its tackiness to permit adherence of said curable foam to the fabric, and
(e) curing the foam material.

3. A method of applying foam to fabric by expanding a chemical foaming mixture against a fabric comprising:
(a) wetting the fabric with water to render at least a portion of the fabric repellent to said chemical foaming mixture,
(b) expanding the chemical foaming mixture in contact with said wetted portion to form a curable organic foam material,
(c) retaining the water within the wetted fabric during reaction of the foaming mixture to control the degree of foam strike-through into the fabric, and
(d) substantially eliminating the water from the fabric before the resultant foam loses its tackiness to permit adherence of said curable foam to the fabric, and
(e) curing the foam material.

4. A method of applying foam to fabric by expanding a chemical foaming mixture against a fabric comprising:
(a) wetting the fabric with a volatile liquid that is substantially immiscible to said chemical foaming mixture to render at least a portion of the fabric repellent to said chemical foaming mixture,
(b) expanding the chemical foaming mixture in contact with said wetted portion, to form a curable organic foaming material,
(c) retaining the liquid within the fabric during reaction of the foaming mixture to control the degree of foam strike-through into the fabric, and
(d) heating the wetted fabric substantially to eliminate the volatile liquid from the fabric before the resultant foam loses its tackiness to permit adherence of said curable foam to the fabric, and
(e) curing the foam material.

5. A method of applying foam to fabric by expanding a chemical foaming mixture against a fabric comprising:
(a) wetting the fabric with liquid containing a thickener to render at least a portion of the fabric repellent to said chemical foaming mixture,
(b) expanding the chemical foaming mixture in contact with said wetted portion to form a curable organic foam material,
(c) retaining the aqueous liquid within the fabric during reaction of the foaming mixture to control the degree of foam strike-through into the fabric, and
(d) substantially eliminating the aqueous liquid from the fabric before the resultant foam loses its tackiness to permit adherence of said curable foam to the fabric, and
(e) curing the foam material.

6. A method of applying foam to fabric by expanding a chemical foaming mixture against a fabric comprising:
(a) wetting a discontinuous fabric with a liquid that is substantially immiscible to said chemical foaming mixture to render at least a portion of the fabric repellent to said chemical foaming mixture,
(b) expanding the chemical foaming mixture in contact with said wetted portion to form a curable organic foam material,
(c) retaining the liquid within the fabric during reaction of the foaming mixture to control the degree of foam strike-through into the fabric, and
(d) substantially eliminating the liquid from the fabric before complete gaseous expansion of the foam mixture has occurred and before the resultant foam loses its tackiness to allow some strike-through of foam into the fabric and to permit adherence of said curable foam to the fabric, and
(e) curing the foam material.

7. A method of applying foam to fabric by expanding a chemical foaming mixture against a fabric comprising:
(a) wetting a cotton fabric with a liquid that is substantially immiscible to said chemical foaming mixture to render at least a portion of the fabric repellent to said chemical foaming mixture,
(b) expanding the chemical foaming mixture in contact with said wetted portion to form a curable organic foam material,
(c) retaining the liquid within the fabric during reaction of the foaming mixture to control the degree of foam strike-through into the fabric, and
(d) substantially eliminating the liquid from the fabric before the resultant foam loses its tackiness to permit adherence of said curable foam to the fabric, and
(e) curing the foam material.

8. A method of applying foam to fabric by expanding a chemical foaming mixture against a fabric comprising:
(a) wetting the fabric backing of a carpet with a liquid that is substantially immiscible to said chemical foaming mixture to render at least a portion of the fabric backing repellent to said chemical foaming mixture,
(b) expanding the chemical foaming mixture in contact with said wetted portion to form a curable organic foam material,
(c) retaining the liquid within the fabric backing during reaction of the foaming mixture to control the degree of foam strike-through into the fabric, and
(d) substantially eliminating the liquid from the fabric backing before complete gaseous expansion of the foam mixture has occurred and before the resultant foam loses its tackiness to allow some strike-through of the foam into the fabric backing to stiffen it and to permit adherence of said curable foam to the fabric, and
(e) curing the foam material.

9. In combination with a process for forming thin foam sheets wherein a chemical foaming mixture is expanded between carrier and cover sheets, the method of applying foam sheet to fabric by expanding a chemical foaming mixture against a fabric comprising:
(a) wetting a length of fabric with a liquid that is substantially immiscible to said chemical foaming mixture to render at least one surface of the fabric repellent to said chemical foaming mixture,
(b) depositing chemical foaming mixture against said wetted surface,
(c) passing the wetted fabric between the carrier and cover sheets,
(d) expanding the chemical foaming mixture in contact with said wetted surface to form a curable organic foam material,
(e) retaining the liquid within the fabric during reaction of the foaming mixture to control the degree of foam strike-through into the fabric, and
(f) substantially eliminating the liquid from the fabric before the resultant foam loses its tackiness to permit adherence of said curable foam to the fabric, and
(g) curing the foam material.

10. In combination with a process for forming thin foam sheets wherein a chemical foaming mixture is expanded between carrier and cover sheets, the method of applying foam sheet to fabric by expanding a chemical foaming mixture against a fabric comprising:

(a) wetting a length of a discontinuous cotton fabric with a liquid that is substantially immiscible to said chemical foaming mixture to render at least one surface of the fabric repellent to said chemical foaming mixture,
(b) depositing chemical foaming mixture against said wetted surface,
(c) passing the wetted fabric between the carrier and cover sheets,
(d) expanding the chemical foaming mixture in contact with said wetted portion to form a curable organic foam material,
(e) retaining the liquid within the fabric during reaction of the foaming mixture to control the degree of foam strike-through into the fabric, and
(f) substantially eliminating the liquid from the fabric before the resultant foam loses its tackiness to permit adherence of said curable foam to the fabric, and
(g) curing the foam material.

11. In combination with a process for forming thin foam sheets wherein a chemical foaming mixture is expanded between carrier and cover sheets, the method of applying foam sheet to fabric by expanding a chemical foaming mixture against a fabric comprising:
(a) wetting the fabric backing of a length of carpet with a liquid that is substantially immiscible to said chemical foaming mixture to render at least one surface of the fabric repellent to said chemical foaming mixture,
(b) depositing chemical foaming mixture against said wetted surface,
(c) passing the carpet with the wetted backing between the carrier and cover sheets,
(d) expanding the chemical foaming mixture in contact with said wetted portion to form a curable organic foam material,
(e) retaining the liquid within the fabric backing during reaction of the foaming mixture to control the degree of foam strike-through into the fabric, and
(f) substantially eliminating the liquid from the fabric backing before complete gaseous expansion of the foam mixture has occurred and before the resultant foam sheet loses its tackiness to allow some strike-through of the foam into the fabric backing to stiffen it and to permit adherence of said curable foam to the fabric, and
(g) curing the foam material.

References Cited by the Examiner

UNITED STATES PATENTS

| | | |
|---|---|---|
| 2,597,025 | 5/1952 | Orth. |
| 2,648,619 | 8/1953 | Alderfer _____ 156—78 X |
| 2,727,278 | 12/1955 | Thompson _____ 264—45 |
| 2,841,205 | 7/1958 | Bird. |
| 2,906,643 | 9/1959 | Dennis. |
| 3,046,177 | 7/1962 | Hankins. |

EARL M. BERGERT, *Primary Examiner.*